US011579236B2

(12) United States Patent
Zhang et al.

(10) Patent No.: US 11,579,236 B2
(45) Date of Patent: Feb. 14, 2023

(54) PARTIAL PHASE VECTORS AS NETWORK SENSORS

(71) Applicant: Cisco Technology, Inc., San Jose, CA (US)

(72) Inventors: Xu Zhang, Santa Clara, CA (US); Abhishek Mukherji, Fremont, CA (US); Huy Phuong Tran, Beaverton, OR (US); Vinay S. Raghuram, Cupertino, CA (US); Matthew Aaron Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 16/356,662

(22) Filed: Mar. 18, 2019

(65) Prior Publication Data
US 2020/0158810 A1 May 21, 2020

Related U.S. Application Data

(60) Provisional application No. 62/770,376, filed on Nov. 21, 2018.

(51) Int. Cl.
*G01S 5/02* (2010.01)
*G01S 5/06* (2006.01)
*H04W 64/00* (2009.01)
*H04W 24/04* (2009.01)

(52) U.S. Cl.
CPC ............. *G01S 5/0215* (2013.01); *G01S 5/06* (2013.01); *H04W 24/04* (2013.01); *H04W 64/003* (2013.01)

(58) Field of Classification Search
CPC ........ G01S 5/0215; G01S 5/06; H04W 24/04; H04W 64/003
USPC .......................................................... 455/423
See application file for complete search history.

(56) References Cited

U.S. PATENT DOCUMENTS

| 7,039,017 | B2 | 5/2006 | Sherlock |
| 9,804,256 | B2 | 10/2017 | Jamieson et al. |
| 9,823,330 | B2 | 11/2017 | Hart et al. |
| 10,009,951 | B2 | 6/2018 | Ponnuswamy |
| 2011/0134833 | A1 | 6/2011 | Gogic |
| 2018/0131434 | A1* | 5/2018 | Islam .................. H04B 7/0814 |
| 2019/0082463 | A1* | 3/2019 | Patil .................. H04W 74/0808 |

* cited by examiner

*Primary Examiner* — Joel Ajayi
(74) *Attorney, Agent, or Firm* — Polsinelli

(57) ABSTRACT

Systems and methods provide for improving the accuracy of a location system. The location system can capture partial phase vector data from one or more access points (APs). The location system can capture associated data associated with the partial phase vector data across multiple dimensions, such as identity data of the APs and client devices generating the partial phase vector data and frequency band data, location data, a time and date, and other data associated with the partial phase vector data. The location system can determine correlation data across the multiple dimensions using the first partial phase vector data and the associated data. The location system can a cause of the partial phase vector data based on the correlation data. The location system can perform one or more remediation actions based on the cause of the partial phase vector data.

20 Claims, 15 Drawing Sheets

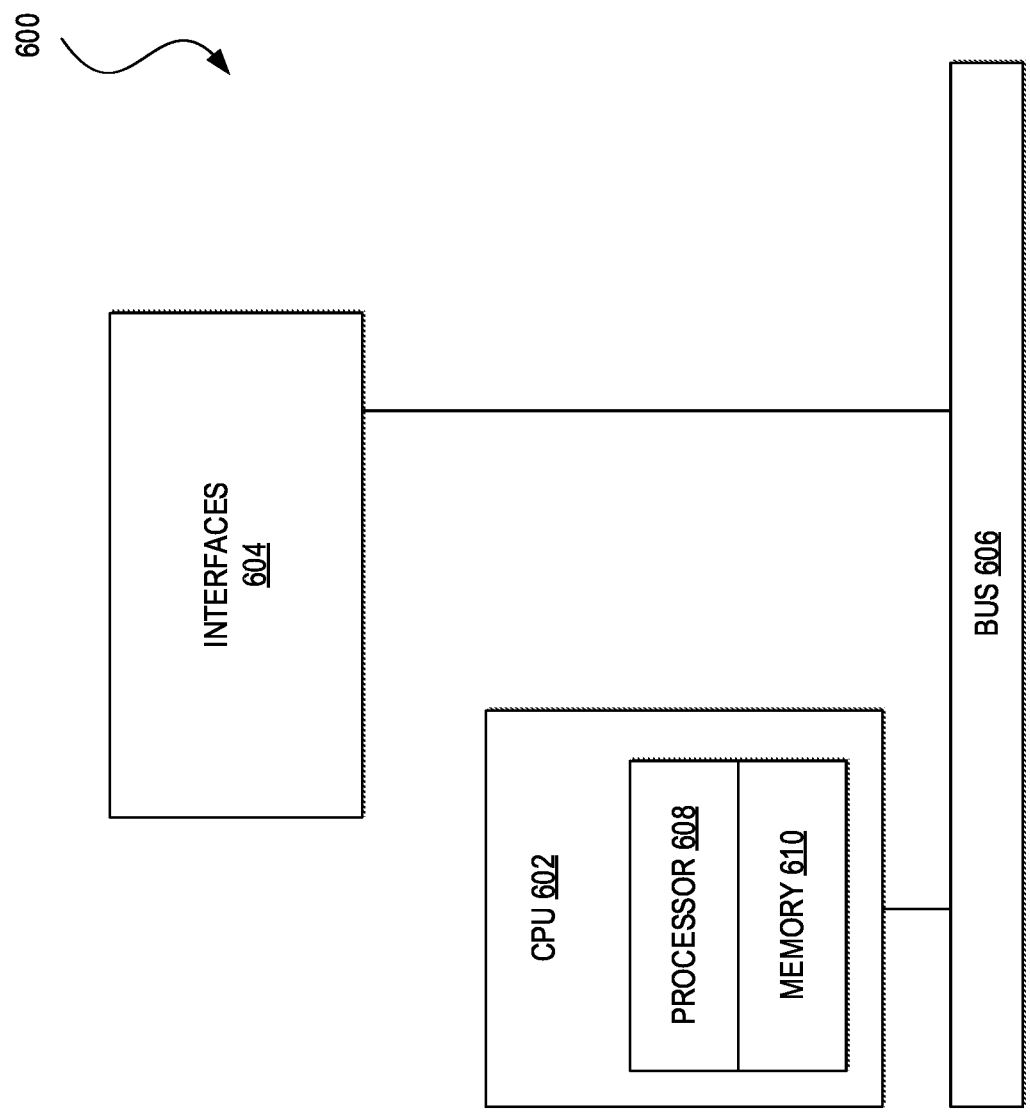

PARTIAL PHASE VECTORS AS NETWORK SENSORS

CROSS-REFERENCE TO RELATED APPLICATIONS

This application claims priority to U.S. Provisional Application No. 62/770,376, filed on Nov. 21, 2018, the content of which is incorporated herein by reference in its entirety.

TECHNICAL FIELD

The subject matter of this disclosure relates in general to the field of wireless computing, and more particularly, to systems and methods for improving the accuracy of a location system.

BACKGROUND

Location systems generally operate to locate objects of interests (e.g., users, devices, and things) within an area. These systems can use a wide variety of technologies to determine the locations of objects of interest. For example, location systems can rely on acoustic signals, optics, magnetic fields, radio waves (e.g., Wi-Fi, Bluetooth, cellular, or other radio frequency (RF) technology), or other sensory information, to pinpoint the location of users, devices, and things. These systems can also utilize various measurement techniques to determine location, such as proximity-based methods, distance-based methods, angle-based methods, pattern-based or fingerprint-based methods, or some combination of these methods.

Angle-based techniques (or angulation) may be based on angle of arrival (AoA) measurements. AoA can be defined by the angle between the propagation direction of an incident wave and some reference direction. A common approach to obtain AoA measurements is to use an antenna array. The location of an object of interest (e.g., a mobile device) can be determined based on the intersection of all rays when two or more non-collinear beacons (e.g., access points or APs) are available. Under ideal conditions (e.g., when there is little to no noise), a minimum of two APs can accurately locate the object of interest. However, such conditions can be rare and it can be challenging to assess the accuracy of a location system and to remediate issues that may be degrading the system's accuracy.

BRIEF DESCRIPTION OF THE FIGURES

To provide a more complete understanding of the present disclosure and features and advantages thereof, reference is made to the following description, taken in conjunction with the accompanying drawings, in which:

FIG. 6 illustrates an example of a network device in accordance with an embodiment.

DESCRIPTION OF EXAMPLE EMBODIMENTS

Figure 1:
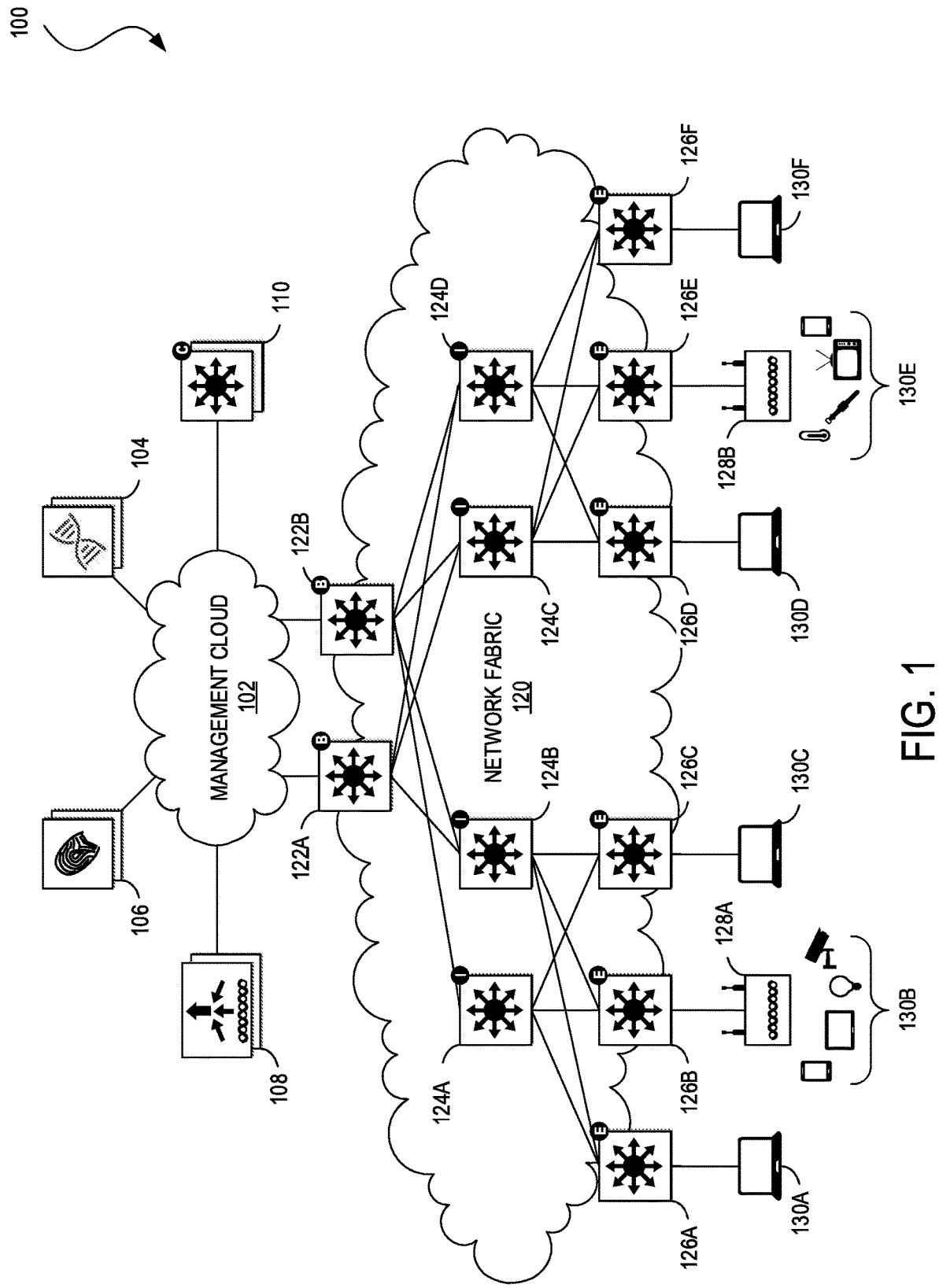
FIG. 1 illustrates an example of a physical topology of an enterprise network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A phase value can be defined as the phase at which an incident wave enters a beacon (e.g., an access point (AP)). In some embodiments, a location system including two or more APs may derive angle of arrival (AoA) measurements from a client device's radio frequency (RF) signals based on phase values reported by the APs. Under ideal conditions (e.g., little to no noise), an AP can capture one phase value for each antenna in the AP's antenna array (collectively, a phase vector). For example, an AP can capture a 1-by-n phase vector for a client device (e.g., laptop, tablet, mobile phone, wearable device, etc.) in these conditions, with n representing the number of antennas of the AP.

APs may have more antennas than RF chains (e.g., chains of RF devices, such as transmitters, receivers, cables, amplifiers, attenuators, measurement instruments, loads, etc.). For example, the Cisco Aironet® 4800 AP has sixteen antennas and four RF chains). APs having more antennas than RF chains may be required to perform several packet exchanges with a client device, with each exchange associated with a different antenna state due to the different connections between antennas and RF chains, in order for the AP to obtain full phase vectors. However, if a portion of these packet exchanges fail, the AP can capture partial phase vectors (or phase vectors missing one or more phase values corresponding to the AP's antenna array) and the accuracy of the location system may decrease.

Various embodiments of the present disclosure can take advantage of detecting partial phase vector data and improve upon prior art location systems by utilizing the partial phase vector and associated data (e.g., APs receiving the partial phase vector data, client devices generating the partial phase vector data, the frequency band at which the partial phase vector data is captured, location data associated with the partial phase vector data, the time and date of the phase vector data, etc.) to assess a location system's accuracy and remediating issues that may be degrading the system's performance. Capture of partial phase vectors can be an indication that packet exchanges between an AP and a client device have failed, such as due to additional RF interference in the environment of the AP and the client device, a fault of the AP, a fault of the client device, and so forth. Partial phase vectors can thus operate as a network sensors to enable a location system to diagnose the root causes of error and prescribe actions to be taken to automatically heal the system.

In some embodiments, the location system can aggregate the partial phase vector data and associated data across multiple dimensions and apply the aggregated data to machine learning models, such as unsupervised learning or clustering models, among others, to determine the dimensions having the strongest correlation. In some embodiments, the location system can present visualizations of the aggregated data across the multiple dimensions. In one embodiment, the location system can present the aggregated data in radar chart form (also referred to as a web chart, spider chart, star chart, etc.) to enable a user to the dimensions of the aggregated data having the strongest correlation.

Systems and methods provide for improving the accuracy of a location system. The location system can capture partial phase vector data from one or more access points (APs). The location system can capture associated data associated with the partial phase vector data across multiple dimensions, such as identity data of the APs and client devices generating the partial phase vector data and frequency band data, location data, a time and date, and other data associated with the partial phase vector data. The location system can determine correlation data across the multiple dimensions using the first partial phase vector data and the associated data. The location system can a cause of the partial phase vector data based on the correlation data. The location system can perform one or more remediation actions based on the cause of the partial phase vector data.

EXAMPLE EMBODIMENTS

FIG. 1 illustrates an example of a physical topology of an enterprise network 100. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliances 104 can function as the command and control system for one or more network fabrics, and can house automated workflows for deploying and managing the network fabrics. The network controller appliances 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliances 104.

The AAA appliances 106 can control access to computing resources, facilitate enforcement of network policies, audit usage, and provide information necessary to bill for services. The AAA appliance can interact with the network controller appliances 104 and with databases and directories containing information for users, devices, things, policies, billing, and similar information to provide authentication, authorization, and accounting services. In some embodiments, the AAA appliances 106 can utilize Remote Authentication Dial-In User Service (RADIUS) or Diameter to communicate with devices and applications. In some embodiments, one or more Cisco® Identity Services Engine (ISE) appliances can operate as the AAA appliances 106.

The WLCs 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLCs 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane nodes 110 are shown to be external to the network fabric 120 in this example, in other embodiments, the fabric control plane nodes 110 may be co-located with the network fabric 120. In embodiments where the fabric control plane nodes 110 are co-located with the network fabric 120, the fabric control plane nodes 110 may comprise a dedicated node or set of nodes or the functionality of the fabric control nodes 110 may be implemented by the fabric border nodes 122.

The fabric control plane nodes 110 can serve as a central database for tracking all users, devices, and things as they attach to the network fabric 120, and as they roam around. The fabric control plane nodes 110 can allow network infrastructure (e.g., switches, routers, WLCs, etc.) to query the database to determine the locations of users, devices, and things attached to the fabric instead of using a flood and learn mechanism. In this manner, the fabric control plane nodes 110 can operate as a single source of truth about where every endpoint attached to the network fabric 120 is located at any point in time. In addition to tracking specific endpoints (e.g., /32 address for IPv4, /128 address for IPv6, etc.), the fabric control plane nodes 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLCs 108 notifying the fabric control plane nodes 110 of joins, roams, and disconnects by the wireless endpoints 130 such that the fabric control plane nodes can have connectivity information about both wired and wireless endpoints in the network fabric 120, and can serve as the single source of truth for endpoints connected to the network fabric. For data plane integration, the WLCs 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLCs 108 can onboard the endpoints into the network fabric 120 and inform the fabric control plane nodes 110 of the endpoints' Media Access Control (MAC) addresses. The WLCs 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane nodes 110 to form a mapping between the endpoints' MAC and IP addresses, and traffic to and from the wireless endpoints 130 can begin to flow.

Figure 2:
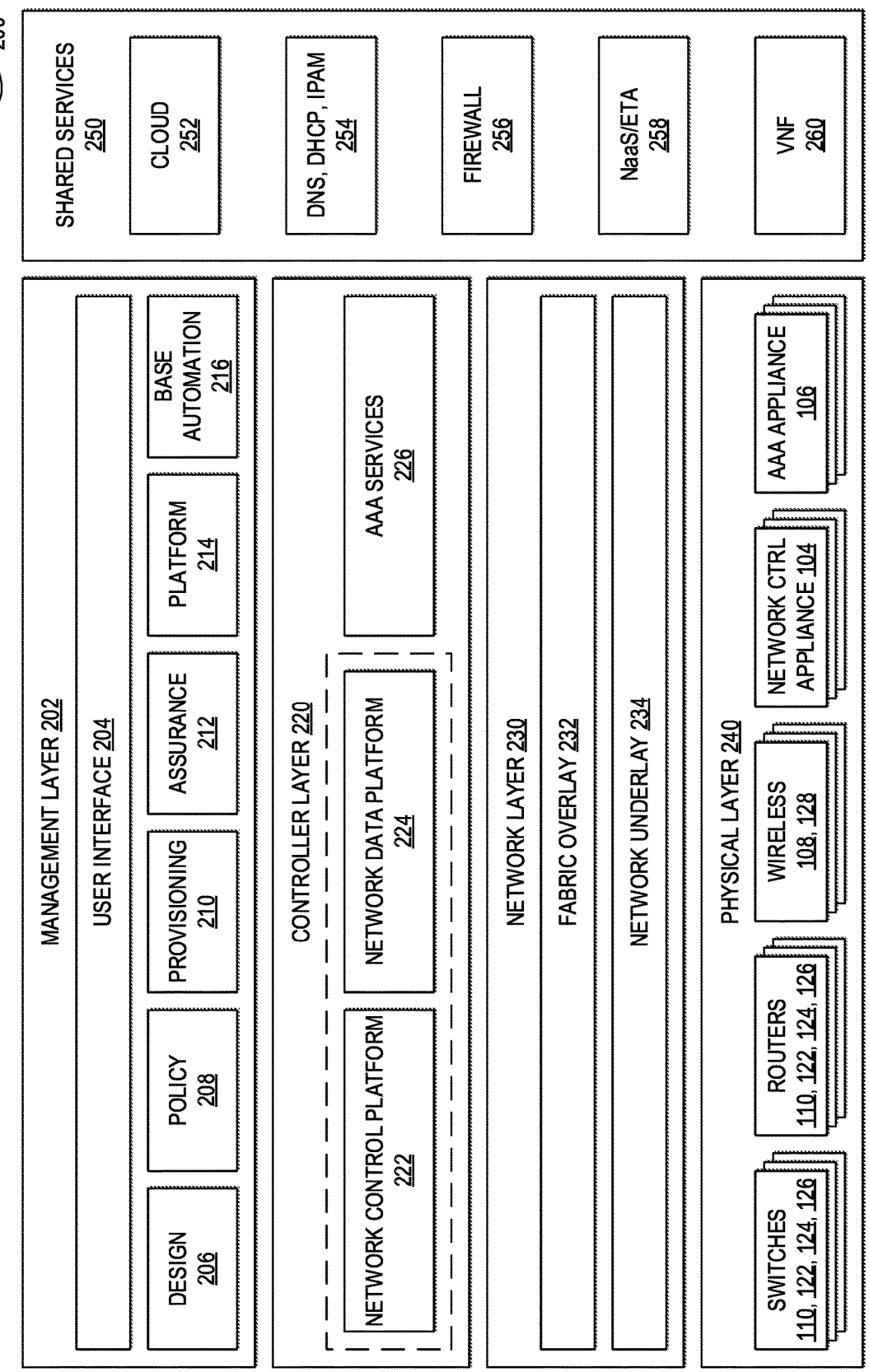
FIG. 2 illustrates an example of a logical architecture for an enterprise network in accordance with an embodiment.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
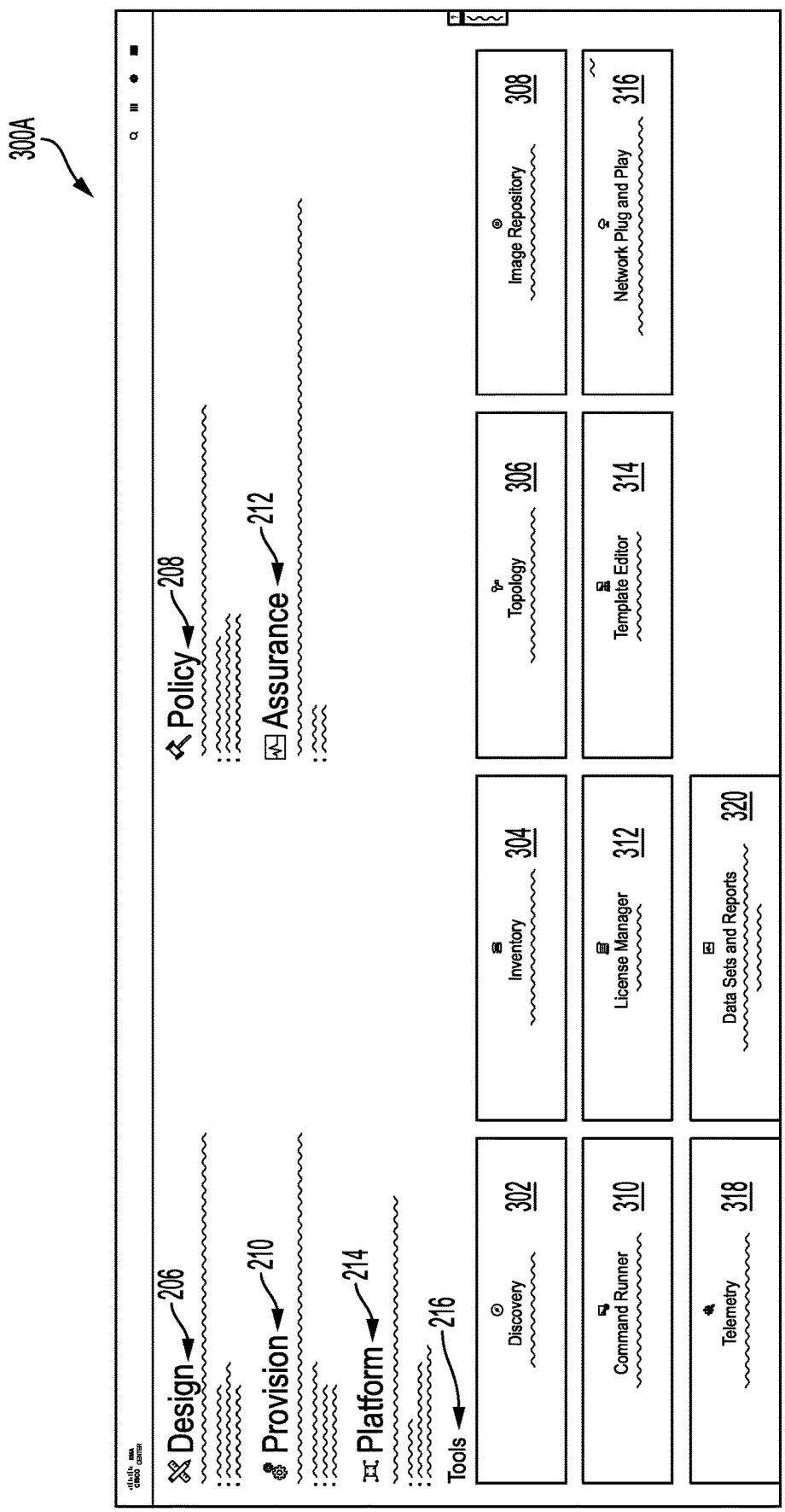
FIGS. 3A-3I illustrate examples of graphical user interfaces for a network management system in accordance with an embodiment.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
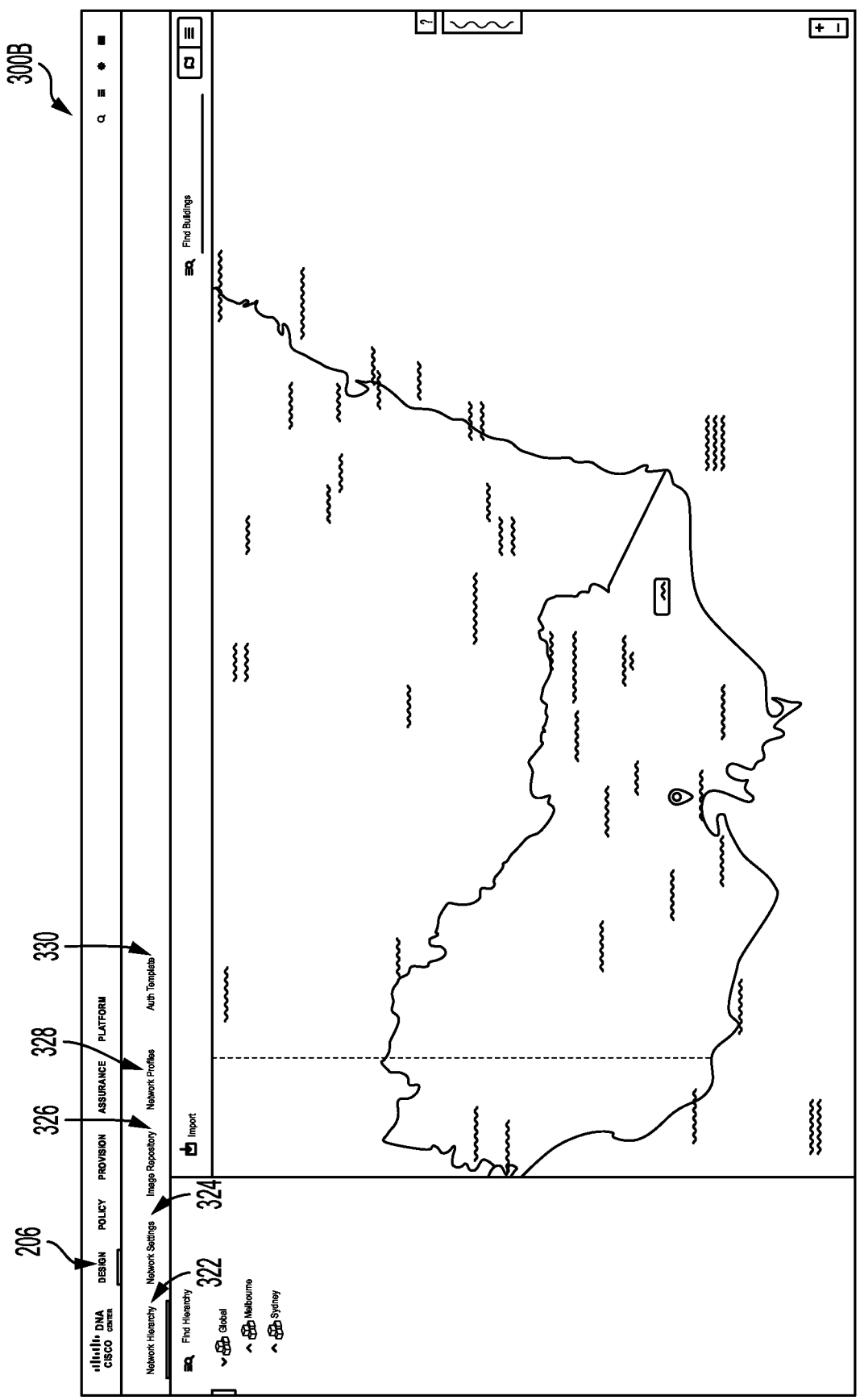

FIG. 3B illustrates a graphical user interface 300B, an example of a landing screen for the design functions 206.

The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
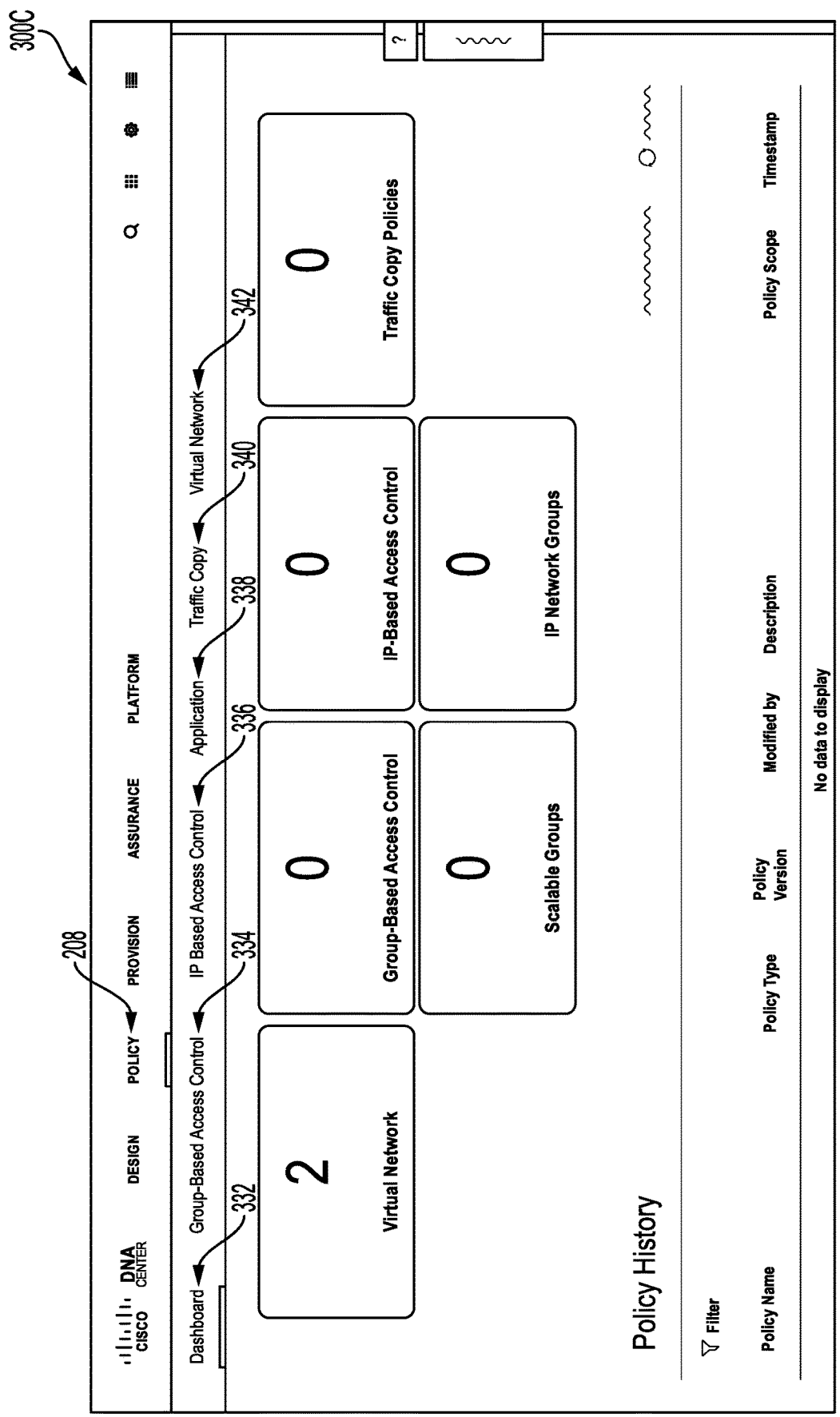

FIG. 3C illustrates a graphical user interface 300C, an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or SGACLs. A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
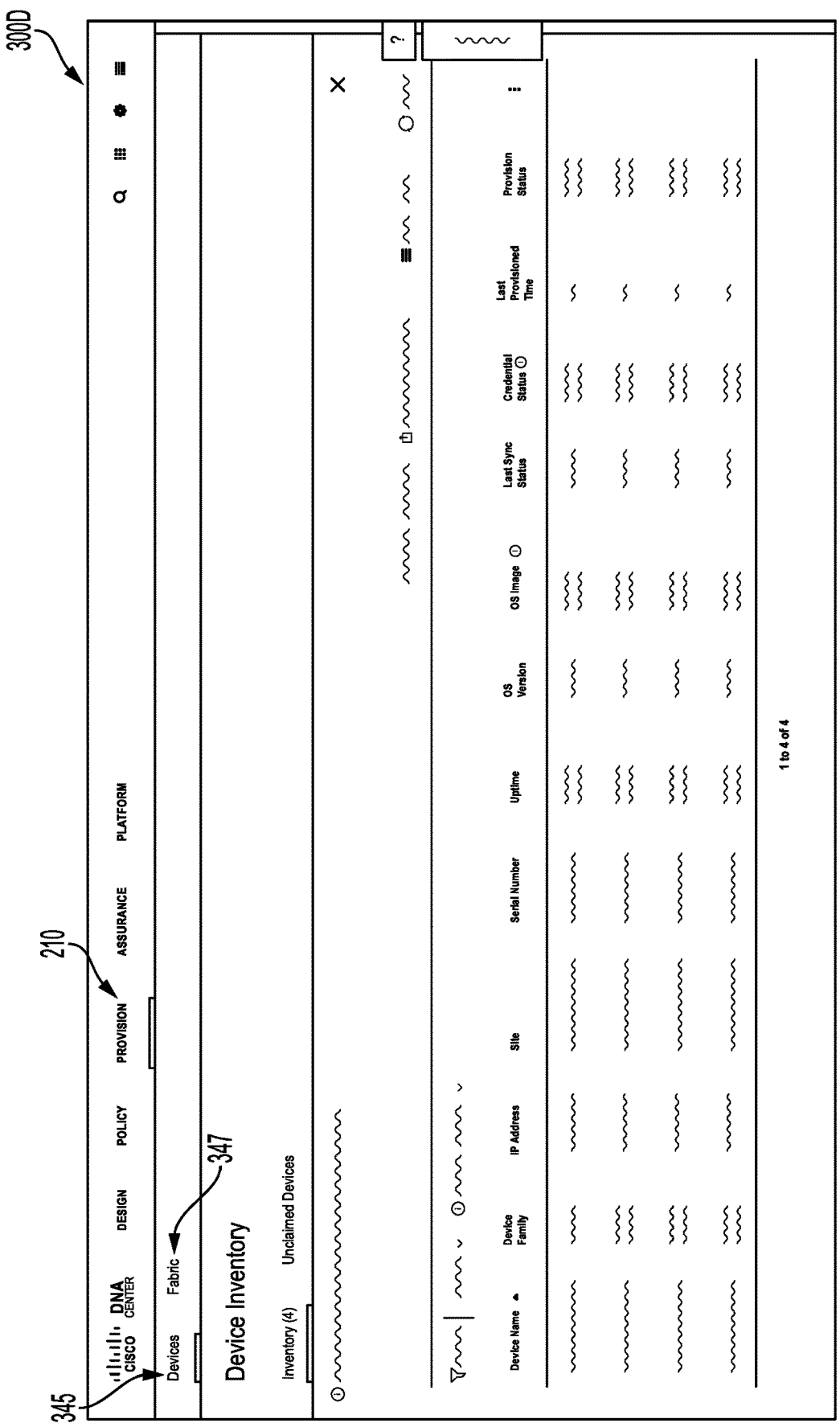

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 345 for assigning devices to the inventory and deploying the required settings and policies, and adding devices to sites; and A fabric provisioning tool 347 for creating fabric domains and adding devices to the fabric.

The output of the provisioning workflow 210 can include the deployment of the network underlay and fabric overlay, as well as policies (defined in the policy workflow 208).

Figure 3E:
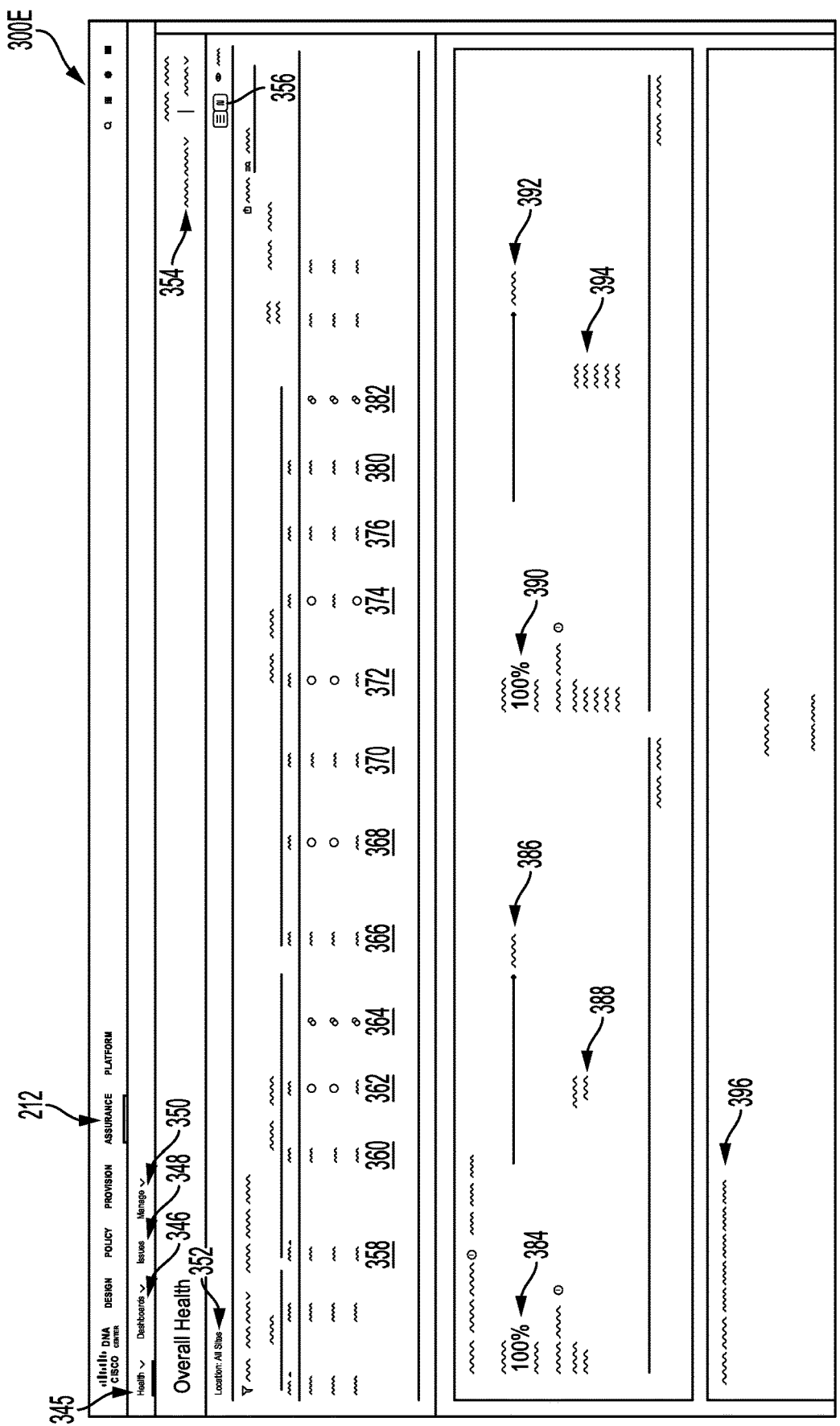

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 352 can enable a user to view the overall health of specific sites (e.g., as defined via the network hierarchy tool 322) and/or network domains (e.g., LAN, WLAN, WAN, data center, etc.). The time period selection user interface element 354 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a device type user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
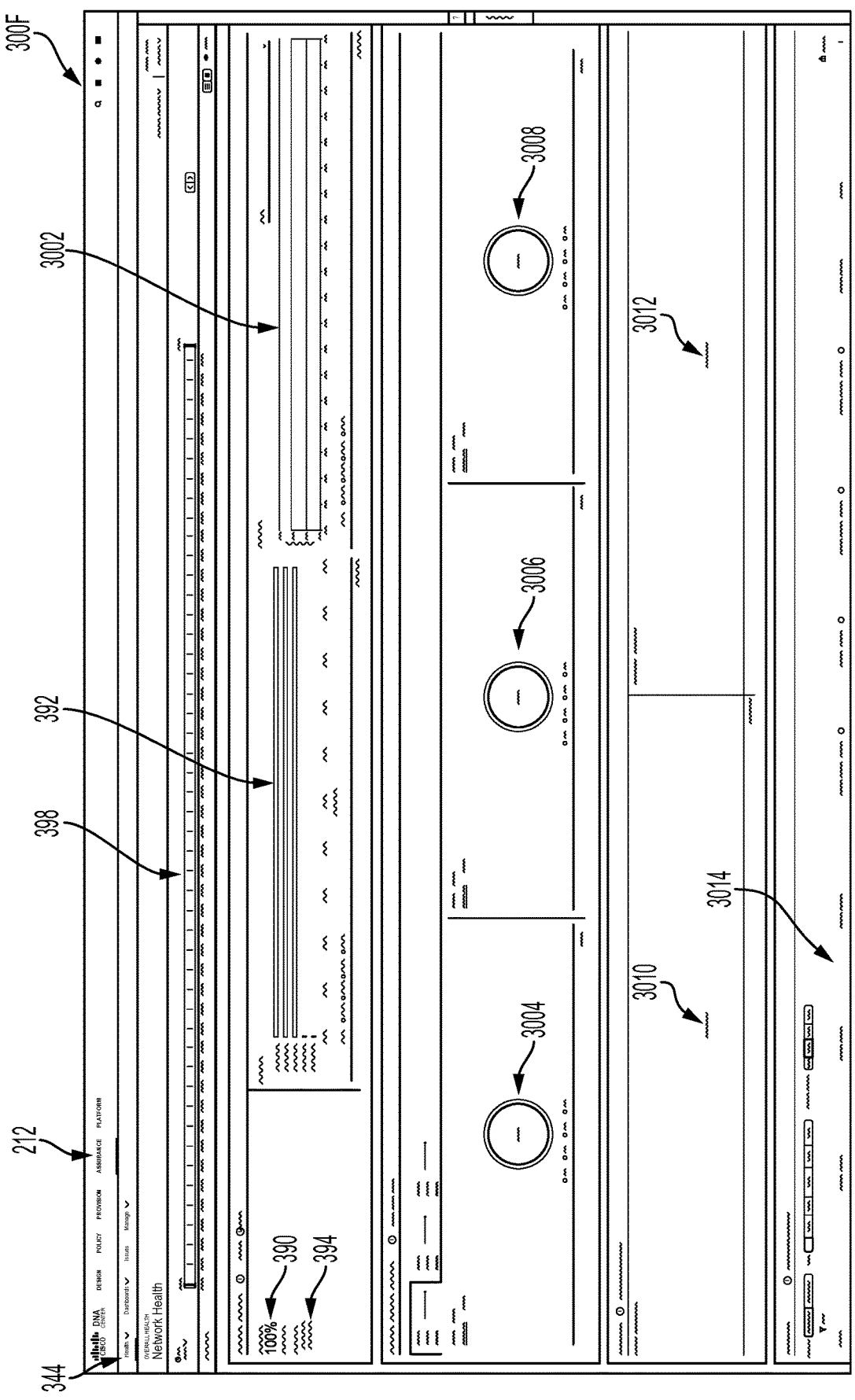

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
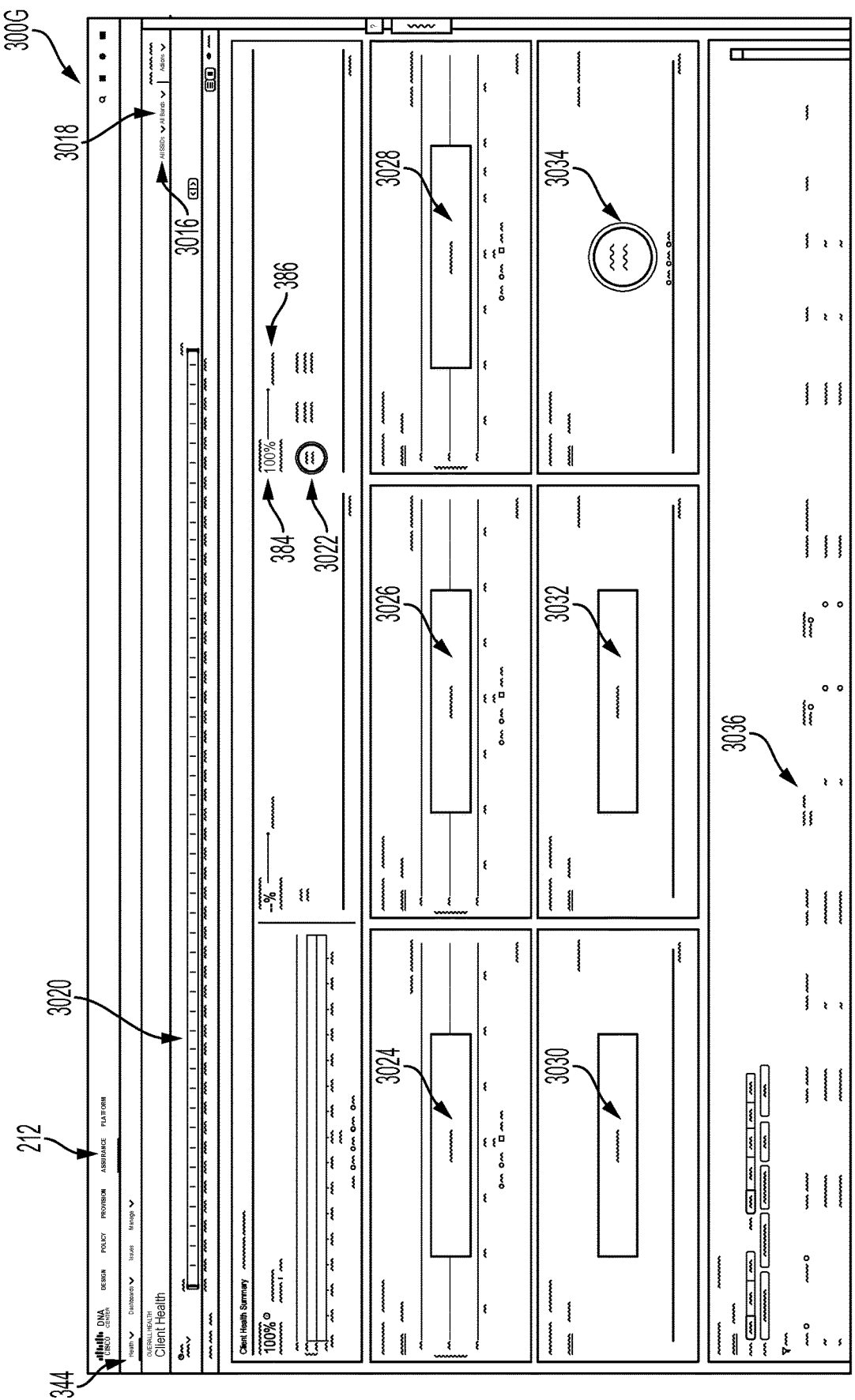

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the timeline slider 398.

The graphical user interface 300G can also include a client health summary user interface element that provides similar information to that shown in the graphical user interface 300E, such as the number of healthy clients as a percentage and a color coded trend chart indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:

Client onboarding times 3024;
Received Signal Strength Indications (RSSIs) 3026;
Connectivity signal-to-noise ratios (SNRs) 3028;
Client counts per SSID 3030;
Client counts per band frequency 3032;

DNS requests and response counters (not shown); and

Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
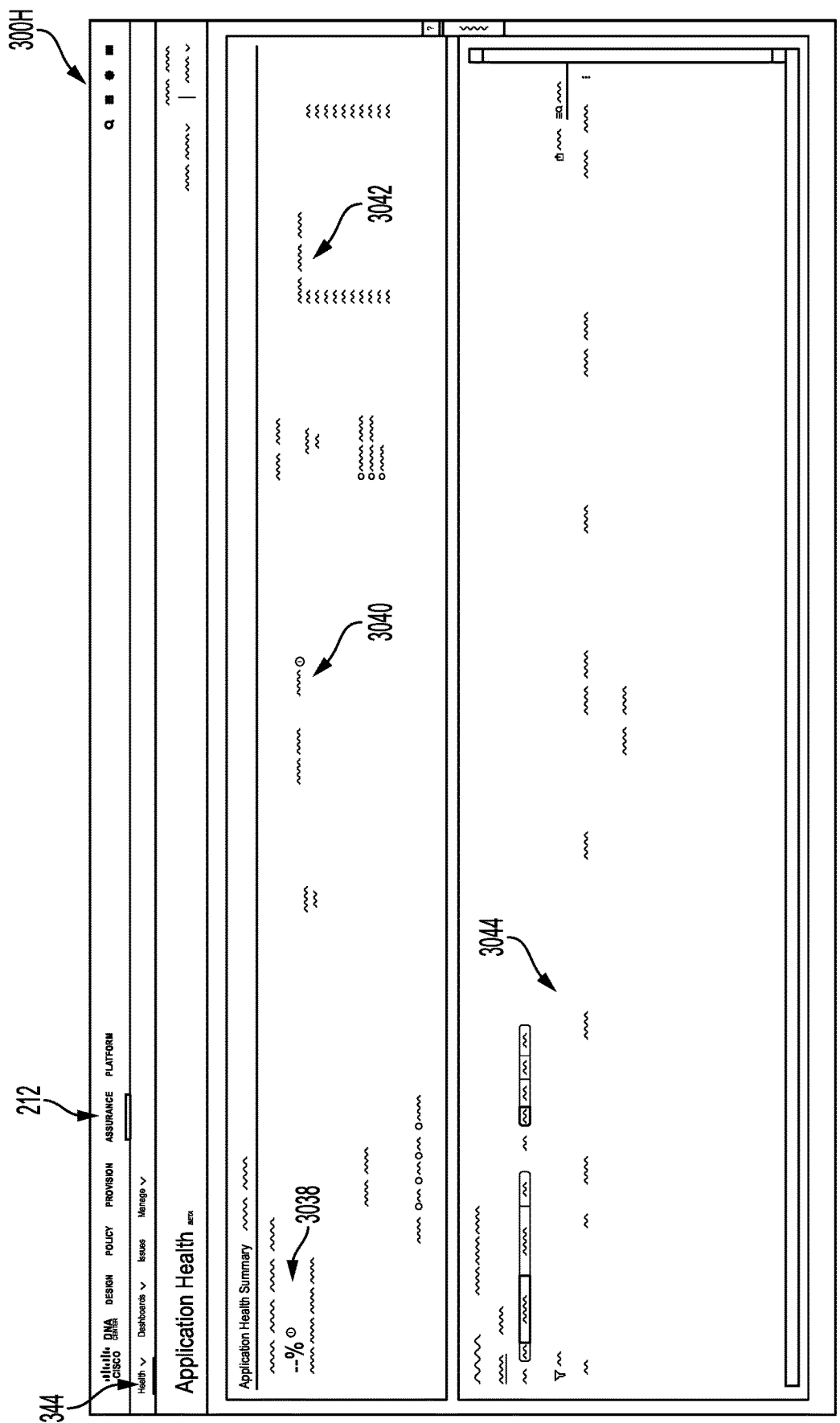

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
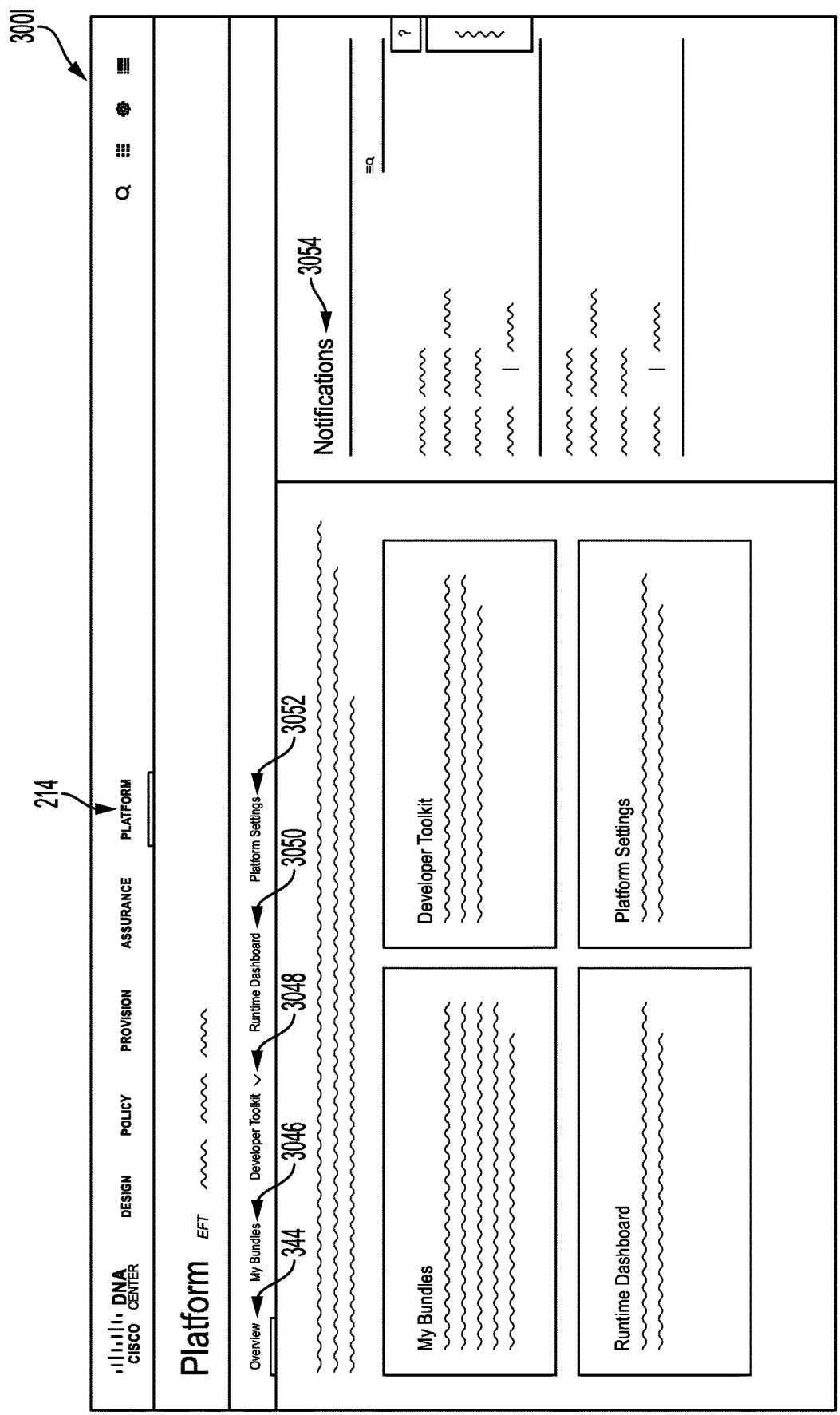

FIG. 3I illustrates an example of a graphical user interface 3001, an example of a landing screen for the platform functions 214. The graphical user interface 300C can include various tools and workflows for integrating with other technology systems. In this example, the platform integration tools and workflows include:

A bundles tool 3046 for managing packages of domain-specific APIs, workflows, and other features for network programming and platform integration;

A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;

A runtime dashboard 3050 for viewing and analyzing basic metrics or API and integration flow usage;

A platform settings tool 3052 to view and set global or bundle-specific settings that define integration destinations and event consumption preferences; and A notifications user interface element 3054 for presenting notifications regarding the availability of software updates, security threats, and so forth.

Returning to FIG. 2, the controller layer 220 can comprise subsystems for the management layer 202 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 222 can provide the design functions 206, the policy functions 208, the provisioning functions 210, the assurance functions 212, and the platform functions 214. In addition, the network control platform 222 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller appliances 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliances 104, and the AAA appliances 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
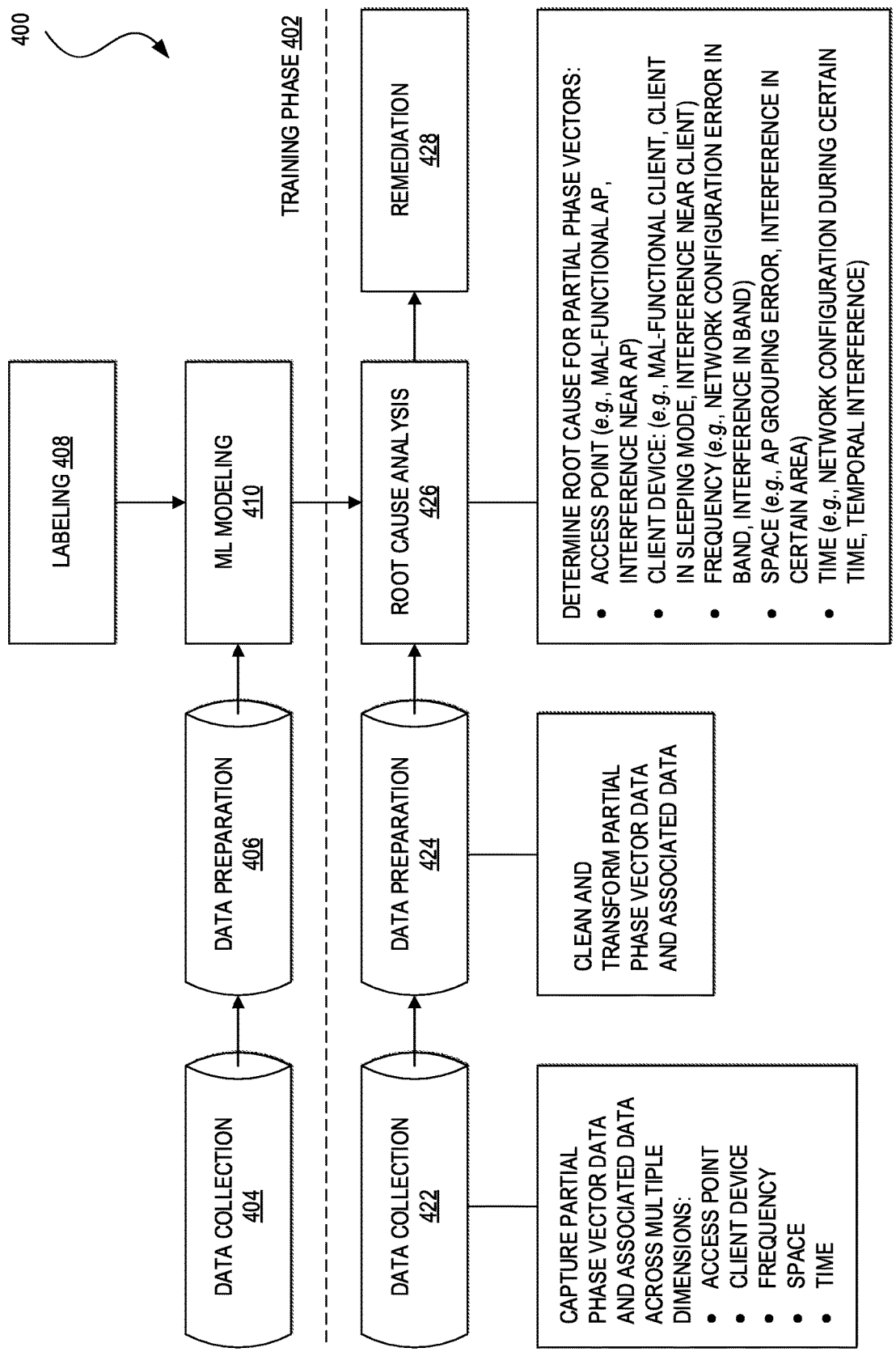
FIG. 4 illustrates an example of a data pipeline for processing partial phase vector data and associated data in accordance with an embodiment.

FIG. 4 illustrates an example of a data pipeline 400 for processing partial phase vector data and associated data. One of ordinary skill will understood that, for any processes discussed herein, there can be additional, fewer, or alternative processing steps performed in similar or alternative orders, or in parallel, within the scope of the various embodiments unless otherwise stated. In some embodiments, the data pipeline 400 may be implemented by an assurance system (e.g., the assurance functions 212) of a network management system (e.g., the network management system implemented by the network controller appliances 104) or other component of the network management system (e.g., location system, analytics system, etc.). In some embodiments, the data pipeline 400 may utilize machine learning for determining the causes of the partial phase vector data.

Approaches for machine learning can include supervised or unsupervised methods. Supervised machine learning can involve determining a label (or class) for an unlabeled data point given a set of training data points (e.g., instances when one or more access points capture partial phase vectors and associated data at those instances) and associated training labels (e.g., a type of error for a location system). Supervised machine learning can comprise two phases, a training phase in which a machine learning model (e.g., a classifier) can be constructed from the training data points and their labels, and an evaluation phase in which the machine learning model can be utilized to determine a label for a new, unlabeled data point. Some example approaches of supervised machine learning include probabilistic classifiers, nearest neighbors classifiers, support vector machines (SVMs), decision trees/random forests, boosting classifiers, and neural networks, among others.

Probabilistic classifiers can use statistical inference to find the best class for a given data point. Probabilistic classifiers can also provide a corresponding probability of the data point being a member of each of the possible classes. Example approaches of probabilistic classifiers include Naive Bayes classifiers, logistic regression, and graphical models, among others.

Naive Bayes classifiers comprise a set of classifiers based on Bayes' theorem of conditional probability or the probability of a class 'c' given a set of feature values 'x':

$$P(c \mid x) = \frac{P(x \mid c)P(c)}{P(x)}, \quad \text{(Equation 1)}$$

where P(c|x) can represent the posterior probability of the class 'c' or the probability of the 'c' class given 'x' feature values, P(x|c) can represent the likelihood or the probability of 'x' feature values given the class 'c', P(c) can represent the prior probability of 'c' or the probability of class 'c' in the training data set, and P(x) can represent the prior probability of the 'x' feature values in the training data set. These classifiers may be characterized as naive because they assume that each feature is independent from one another for simplifying the calculation of P(x|c). The naive Bayes probability model can be combined with a decision rule for classification, such as a Maximum A Posteriori (MAP) rule, that classifies a data point based on a class having the greatest probability among the possible classes. Different types of naive Bayes classifiers may use different assumptions regarding the distribution of P(x|c), such as a Gaussian distribution, a multinomial distribution, or a Bernoulli distribution, among others Logistic regression can be used to predict the probability of a class based on one or more observed feature values. Logistic regression may rely on a logistic function (e.g., sigmoid function, s-curve, etc.) to model the relationship between the class and feature values. In particular, logistic regression can model the log odds of 'p' or logit of 'p' as a linear combination of the feature values '$x_a$':

$$\operatorname{logit}(p) = \log\left(\frac{p}{1-p}\right) = \beta_0 + \beta_1 x_1 + \ldots + \beta_n x_n, \quad \text{(Equation 2)}$$

where p/(1−p) can represent the odds of the occurrence of an event, (β0 . . . βn represent coefficients of the logit function, and $x_1$ . . . $x_n$ can represent the feature values. Logistic regression can involve finding the values of the coefficients β that best fits the training data, such as by using maximum likelihood estimation (MLE). Probability can then be derived from:

$$p = \frac{e^{logit}}{1 + e^{logit}} = \frac{1}{1 + e^{-logit}} \quad \text{(Equation 3)}$$

Logistic regression models can be binomial (e.g., zero or one, class or not the class, etc.), multinomial (e.g., three or more unordered classes), or ordinal (e.g., three or more ordered classes).

A graphical model is a probabilistic model in which a graph can denote the conditional independence structure between random variables. Graphical models can provide a way to visualize the structure of a probabilistic model and to construct new models. In a probabilistic graphical model, each node can represent a random variable, and each edge can represent a probabilistic relationship between variables. The graph can reflect the way in which the joint distribution over all of the random variables can be decomposed into a product of factors, each depending only on a subset of the variables.

In a nearest neighbor classifier, the top 'k' nearest neighbors to an unlabeled data point can be identified from the training data. The class label with the largest presence among the 'k' nearest neighbors can be designated as the class label for the unlabeled data point. In some embodiments, training data points may be aggregated for improving classification. For example, small clusters can be determined from the instances of each class, and the centroid of each cluster may be used as a new instance. Such an approach may be more efficient and more robust to noise. Other variations may use different similarity (or distance) functions, such as the Minkowski distance or the Mahalanobois distance.

The Minkowski distance may be appropriate where feature vectors are independent and each feature vector is of equal importance. For example, if D is the distance between feature vectors v and w, and $f_i(x)$ is the number of features in a bin i of x, the Minkowski distance can be defined as:

$$D(v,w) = (\Sigma_i |f_i(v) - f_i(w)|^p)^{1/p}, \quad \text{(Equation 4)}$$

where p=1 is the $L_1$ distance (also sometimes called the Manhattan distance), p=2 is the $L_2$ distance (also known as the Euclidean distance), and p=∞ is the L∞ (also called the Chebyshev distance).

The Mahalanobis distance may be appropriate when each dimension of the feature vector is dependent of each other and is of different importance. The Mahalanobis distance can be defined as:

$$D(v,w) = \sqrt{(\mathcal{F}_v - \mathcal{F}_w)^T C^{-1} (\mathcal{F}_v - \mathcal{F}_w)}, \quad \text{(Equation 5)}$$

where C is the covariance matrix of the feature vectors v and w, $\mathcal{F}_v$ and $\mathcal{F}_w$ are vectors that list all the feature values in $f_i(v)$ and $f_i(w)$.

Other similarity (or distance) measures that can also be used include the cosine similarity, Jaccard coefficient, the Pearson correlation coefficient, and the averaged Kullback-Leibler divergence, among others. Some embodiments may also use various indexing structures or techniques for efficiently searching the feature set space, including multi-dimensional hashing, which can map features into fix-sized bins or buckets based on some function applied to each feature; locality sensitive hashing, which can use unions of independently computed hashing functions to index features; or multi-dimensional search trees, such as k-d trees, which can divide the multi-dimensional feature space along alternating axis-aligned hyper-planes to maximize search tree balance; among other approaches.

Support vector machines may be constructed by finding the linear conditions (referred to as a hyper-plane) that best separate classes from one other. Generating an SVM can involve plotting data points in n-dimensional space (where n is the number of features of the data points), identifying the hyper-planes that differentiate classes, and maximizing the distances (referred to as the margin) between the data points of the classes. In other words, an SVM classifier may identify the maximum margin hyper-plane from the training data set.

A decision tree may be created from a data set in which each node of the tree can correspond to one or more features, and a branch or edge from the node to a child node can correspond to the possible values of the features. Each leaf can represent a class label whose feature values satisfy the specified ranges of the path from the root of the tree to the leaf. The partitioning at each level of the tree can be based on a split criterion, such as a condition or rule based on one or more features. Decision trees try to recursively split the training data so as to maximize the discrimination among different classes over different nodes of the tree. Decision tree algorithms may differ on how to select the splitting features and how to prune the tree when it becomes too large. Some examples of decision tree classifiers include Iterative Dichotomiser 3 (ID3), C4.5, Classification and Regression Tree (CART), and Chi-squared Automatic Interaction Detector (CHAID), among others.

Random forests may rely on a combination of decision trees in which each tree may depend on the values of a random vector sampled independently and with the same distribution for all trees in the forest. A random forest can be trained for some number of trees 't' by sampling 'n' cases of the training data at random with replacement to create a subset of the training data. At each node, a number 'm' of the features can be selected at random from the set of all features. The feature that provides the best split can be used to do a binary split on that node. At the next node, another number 'm' of the features can be selected at random and the process can be repeated.

Boosting classifiers attempt to identify a highly accurate hypothesis (e.g., low error rate) from a combination of many "weak" hypotheses (e.g., substantial error rate). Given a data set comprising data points within a class and not within the class and weights based on the difficulty of classifying a data point and a weak set of classifiers, boosting can generate and call a new weak classifier in each of a series of rounds. For each call, the distribution of weights may be updated to reflect the importance of the data points in the data set for the classification. On each round, the weights of each incorrectly classified data point can be increased, and the weights of each correctly classified data point can be decreased so the new classifier can focus on the difficult data points (i.e., those data points that have not been correctly classified). Some examples of boosting methods include Adaptive Boosting (AdaBoost), Gradient Tree Boosting, and XGBoost, among others.

Neural networks may be inspired by biological neural networks and can comprise an interconnected group of functions or classifiers that process information using a connectionist approach. The basic units of a neural network can be neurons (or perceptrons) that are connected to one another based on weights representing the strength of the connection between the units. A neural network can take input data from a set of dedicated input neurons and deliver its output to a set of dedicated output neurons. However, a neuron can generally operate as both an input unit and/or an output unit. For classification, a neural network can be characterized by the model of the neuron (e.g., binary threshold unit, linear threshold unit, linear unit, sigmoidal unit, distance unit, radial basis unit, polynomial unit, Gaussian unit, etc.), its net value function (e.g., the unit's parameters or weights to summarize input data), and its activation function (e.g., how the unit may transform the net value into an output value); the architecture or the topology connecting the neural network (e.g., single-layer network, multi-layer network, network with feedback, etc.); the data encoding policy defining how input data (e.g., feature vector) or class labels are represented in the network, and the training algorithm used to determine the optimal set of weights associated with each unit (e.g., Hebbian rule, delta rule, etc.). Examples of neural networks can include the multi-layer neural network, the auto associative neural network, the probabilistic decision-based neural network (PDBNN), and the sparse network of winnows (SNOW), among others.

Unsupervised machine learning can operate on an unlabeled data set, and can involve grouping the data set in a manner such that data points in the same group are more similar (or less distant) to data points in other groups. Some examples of unsupervised learning include partitional clustering, hierarchical clustering, density-based clustering, and grid-based clustering, among others.

Partitional clustering can divide data points into a predetermined number of partitions where each partition can represent a cluster. Clusters can be formed by optimizing a partitioning criterion, such as maximizing a similarity measure of data points within a cluster and/or maximizing a distance measure between data points in different clusters. Some examples of partitioning clustering include k-means clustering, k-medians clustering, k-medoids clustering, and other variations. K-means clustering can proceed by alternating steps, assignment and update. During assignment, each data point can be assigned to a cluster having the nearest mean to the data point. During update, the new means can be calculated to be the centroids of the data points in the new clusters. Convergence can be achieved when the assignments no longer change. K-medians can compute the nearest median to represent each cluster during assignment and update. K-medoids can use real data points (referred to medoids) as the cluster centers. Other variations of partitional clustering methods can utilize different initialization criteria (e.g., how the initial centroids are selected), assignment functions, update functions, and similarity or distance measures, among others.

Hierarchical clustering methods can sort data into a hierarchical structure (e.g., a dendrogram) based on a similarity (or distance measure). Hierarchical clustering can be divisive or agglomerate. Divisive hierarchical clustering can take a top-down approach (e.g., in which all data points initially belong to a single cluster) and split or decompose "central" nodes of the hierarchical structure, where the measure of "centrality" can be based on "degree" centrality (e.g., a node having the most number of edges incident on the node or the most number of edges to and/or from the node), "betweenness" centrality (e.g., a node operating the most number of times as a bridge along the shortest path between two nodes), "closeness" centrality (e.g., a node having the minimum average length of the shortest path between the node and all other nodes of the graph), among others (e.g., Eigenvector centrality, percolation centrality, cross-clique centrality, Freeman centrality, etc.). Agglomerative clustering can take an opposite approach from divisive hierarchical clustering. Instead of beginning from the top to bottom, agglomerative clustering can create the hierarchical structure from bottom to top (e.g., in which each data point initially belongs to a singleton cluster). In such an approach, clustering may be initiated with individual nodes and gradually combining nodes or groups of nodes together to form larger clusters. Certain measures of the quality of the cluster can determine the nodes to group together at each iteration. A common measure of quality is graph modularity.

Density-based clusters can be connected, dense areas in the data space that may be separated from each other by less dense regions. Density-based clusters can have arbitrary shape, and data points can be arbitrarily distributed. An example of density-based clustering is density-based spatial clustering of applications with noise (DBSCAN). The DBSCAN algorithm may take each point of a data set to be the center of a sphere of radius epsilon and count the number of data points within the sphere. If the number points within the sphere are more than a threshold, then the points inside the sphere may belong to the same cluster. The DBSCAN algorithm can expand the sphere in the next iteration using the new sphere center and applying the same criteria for the data points in the new sphere. When the number of points inside a sphere is less than the threshold, that data point can be ignored.

Grid-based clustering can divide a data set into cells of a grid. This structure can be then used as a basis for determining the final data partitioning. Some examples of grid-based clustering include Wave Clustering and Statistical Information Grid (STING). Wave clustering can fit a data space onto a multi-dimensional grid, transform the grid by applying wavelet transformations, and identify dense regions in the transformed data space. STING can divide a data space into rectangular cells and compute various attributes for each cell (e.g., mean, maximum value, minimum value, etc.). Features of higher level cells can be computed from lower level cells. Clusters can be identified based on count and cell size information.

Turning back now to FIG. 4, the data pipeline 400 can include two primary phases, a training phase 402 and an evaluation phase 420. However, some embodiments may not include a training phase, such as when the data pipeline 400 utilizes unsupervised learning for analyzing partial phase vector data and associated data. Other embodiments may include additional phases, such as when the data pipeline 400 utilizes reinforcement learning and includes one or more feedback loops to revise one or more machine learning models generated from the partial phase vector data and associated. In addition, other embodiments may include more or fewer stages in the same order or a different order in the training phase 402 and the evaluation phase 420.

In this example, the training phase 402 can include a data collection stage 404, a data preparation stage 406, a labeling stage 408, and a machine learning modeling stage 410. The data collection stage 404 can include processes for collecting partial phase vector data and associated data across multiple dimensions or domains, such as identity data of the APs capturing the partial phase vector data (e.g., MAC address, IP address, make, model, etc.), identity data of the client devices generating the partial phase vector data (e.g., MAC address, IP address, make, model, user/group, etc.), the frequency band associated with the partial phase vector data (e.g., 2.4 GHz, 5 GHz, etc.), location data associated with the partial phase vector data (e.g., the location of the APs, the location of the client devices, etc.), the time and date of the partial phase vector data, and so forth. In some embodiments, the APs can also be configured to collect associated data upon capturing the partial phase vector data when communicating with client devices. For example, when an AP captures a partial phase vector from a client device, the AP can capture the identity of the client device, the frequency band associated with the partial phase vector, the location of the client device, a timestamp, and so forth.

The data preparation stage 406 can include processes for preparing the partial phase vector data and associated data captured during the data collection stage 404 for input into downstream processes. Data preparation can include data cleansing and data transformation tasks, among others. Examples of data cleansing tasks can include the processing or handling of missing values (e.g., ignoring data points having missing feature values, substituting missing values with dummy values, mean, mode, median, etc.), duplicate values or redundant or insignificant data (e.g., deleting or aggregating duplicate or redundant or insignificant data), and outliers or noise (e.g., binning, regression, deleting, etc.), among other irregularities.

Data transformation can comprise various tasks for converting data captured in one format to a preferred format. Data transformation tasks can include generalization (e.g., converting specific feature values to less specific feature values, such as translating Global Positioning System (GPS) coordinates to an office building, street address, city, state, country, etc.), rescaling (e.g., normalization, standardization, min-max scaling, etc.), aggregation (e.g., summarizing or consolidating data, such as combining multiple instances of partial phase vectors detected every second for ten minutes into a single instance representing a ten-minute span), discretization (e.g., converting continuous values to discrete values, binning, binarization, etc.), non-linear transformations (e.g., mapping feature values to a uniform distribution, Gaussian distribution, etc.), and other transformations (e.g., converting a partial phase vector of float values to a bit string representation where a string index can correspond to an antenna number, a 0 can indicate that the associated antenna reported no phase value, and a 1 can indicate that the associated antenna reported a phase value; compressing the data; encoding categorical data, such as encoding an access point or client device's make or manufacturer in string format, to numeric data, like an ordinal number; etc.).

In some embodiments, APs may be configured to perform data cleansing tasks and/or data transformation tasks (in any order) prior to transmitting the (partially) cleansed and/or transformed partial phase vector data and associated data to downstream processes, and the downstream processes may perform additional data cleansing tasks and/or data transformation tasks (in any order). In other embodiments, the APs may transmit raw partial phase vector data and associated data to downstream processes, and the downstream processes may perform the data cleansing tasks and/or data transformation tasks (in any order).

The labeling stage 408 can include processes for applying labels to the data points generated during the data preparation stage 406 for input into the machine learning modeling stage 410. For example, the output of the machine learning modeling stage 410 may be a multi-class classifier. The classes may comprise high-level causes for the APs capturing partial phase vector data, such as AP error, client device error, frequency band error, spatial error, temporal error, and so forth. In other embodiments, the classes can comprise more specific or granular causes for the APs capturing partial phase vector data, such as a malfunctional AP, interference near the AP, a malfunctional client device, interference near the client device, a network configuration error in a frequency band, interference in the frequency band, an AP grouping error, interference in a specific location, a network configuration error occurring at a certain location, temporal interference, and so forth. In some embodiments, training data may be simulated or synthetized for generating the training samples and associated labels.

Alternatively or in addition, the partial phase vector data and associated data may be collected for a specified period of time or until a specified number of training samples have been generated (e.g., a threshold total number of training samples, a threshold number of training samples within each class, etc.), and labels can be retroactively applied to the training samples after the causes for the partial vector data corresponding to the training samples have been determined.

The machine learning modeling stage 410 can include processes for generating machine learning models for identifying the causes of partial phase vector data from the training samples generated during the data preparation stage 406 and the labels applied to the training samples during the labeling stage 408. In some embodiments, machine learning classifiers may be generated using the classification techniques discussed above (e.g., Naive Bayes, logistic regression, nearest neighbors classifier, support vector machine, decision tree/random forest, boosting, or neural network classifier, or other machine learning classifier). Alternatively or in addition, clusterers may be generated using the clustering algorithms discussed above (e.g., partitional clustering, hierarchical clustering, density-based clustering, grid-based clustering, or other clusterer). The machine learning models may be utilized during the evaluation phase 420 for determining the causes of partial phase vector data of new instances.

In this example, the evaluation phase 420 can include a data collection stage 422, a data preparation stage 424, a root cause analysis stage 426, and a remediation stage 428. The data collection stage 422 and the data preparation stage 424 can include the same or similar processes as the data collection stage 404 and the data preparation stage 406 stage, respectively, for collecting partial phase vector data and associated data, cleaning the data, and transforming the data.

The root cause analysis stage 426 can include processes for applying the data points generated during the data preparation stage 424 to the machine learning models generated during the machine learning model stage 410 to determine the causes of partial phase vector data. For example, if the machine learning models include a classifier, the classifier can receive input data points representing the partial phase vector data and associated data and output a class label identifying the cause of the partial phase vector data. If the machine learning models include a clusterer, the clusterer can receive the input data points and output clusters of similar instances that may indicate the cause of the partial phase vector data.

In some embodiments, the machine learning models may output data indicative of the cause of partial phase vector, such as a class label or a cluster of similar instances indicating that the cause of the partial phase vector data is a malfunction of the AP rather than RF interference if the partial phase vector data is limited to a first AP but no other APs within the vicinity of the first AP capture partial phase vector data. As another example, the machine learning models may output data indicative of the cause of the partial phase vector data is a malfunction of the AP in a specific frequency band if the partial phase vector data is further limited to that frequency band.

In some embodiments, the machine learning models may output data indicative of the cause of the partial phase vector data is a malfunction of a particular client device if the partial phase vector data is limited to a certain client MAC address. On the other hand, the machine learning models may output data indicative of the cause of the partial phase vector data is a class of client devices if the partial phase vector data is limited to a group of the same type of client devices.

In some embodiments, the machine learning models may output data indicative of the cause of the partial phase vector data is RF interference at a location if the partial phase vector data is concentrated in that location and not distributed across other APs and client devices.

In some embodiments, the machine learning models may output data indicative of the cause of the partial phase vector data is RF interference at a particular period of time if substantial portion of the partial phase vector data is observed at that time. Similarly, the machine learning models may output a higher confidence level if the partial phase vector data is not distributed across APs and clients.

The remediation stage 428 can include processes for automating remediation of the causes of the partial phase vector data. In some embodiments, the results from the root cause analysis (e.g., classification or clustering) can be used for automatic remediation. For example, past instances in the same class or cluster as the current state of a location system can provide context for resolving the causes of partial phase vector data. That is, if the partial vector data and associated data exhibit strong correlation with past instances, then the prescriptive actions used for those past instances may also be applied to the location system to resolve what is currently afflicting the location system.

In some embodiments, previous processes used to solve similar past instances can be applied to the partial phase vector data and associated data to simulate the effects the previous processes may have on the current state of the location system. This can be especially advantageous because it enables system troubleshooting in a test environment without affecting a production environment.

Past actions taken to remediate previous instances of partial phase vector data and associated data in the same class or cluster as the current state of the location system may be performed to address the current state of the location system if those past instances strongly correlate to the current state of the location system. Some examples of remediation actions can include temporarily removing a malfunctional AP out of an AP group for location computation, tagging the malfunctional client device, changing the APs to operate in a different channel if its determined that the current channel has extra interference (e.g., due to heavy traffic), and temporarily increasing the number of Block Acknowledgement Requests (BARs) that APs send to certain clients (this can temporarily increase network traffic and consume additional power but can reduce the chances that the APs will report partial phase vectors and thereby increase location accuracy), among other remediation actions.

Figure 5:
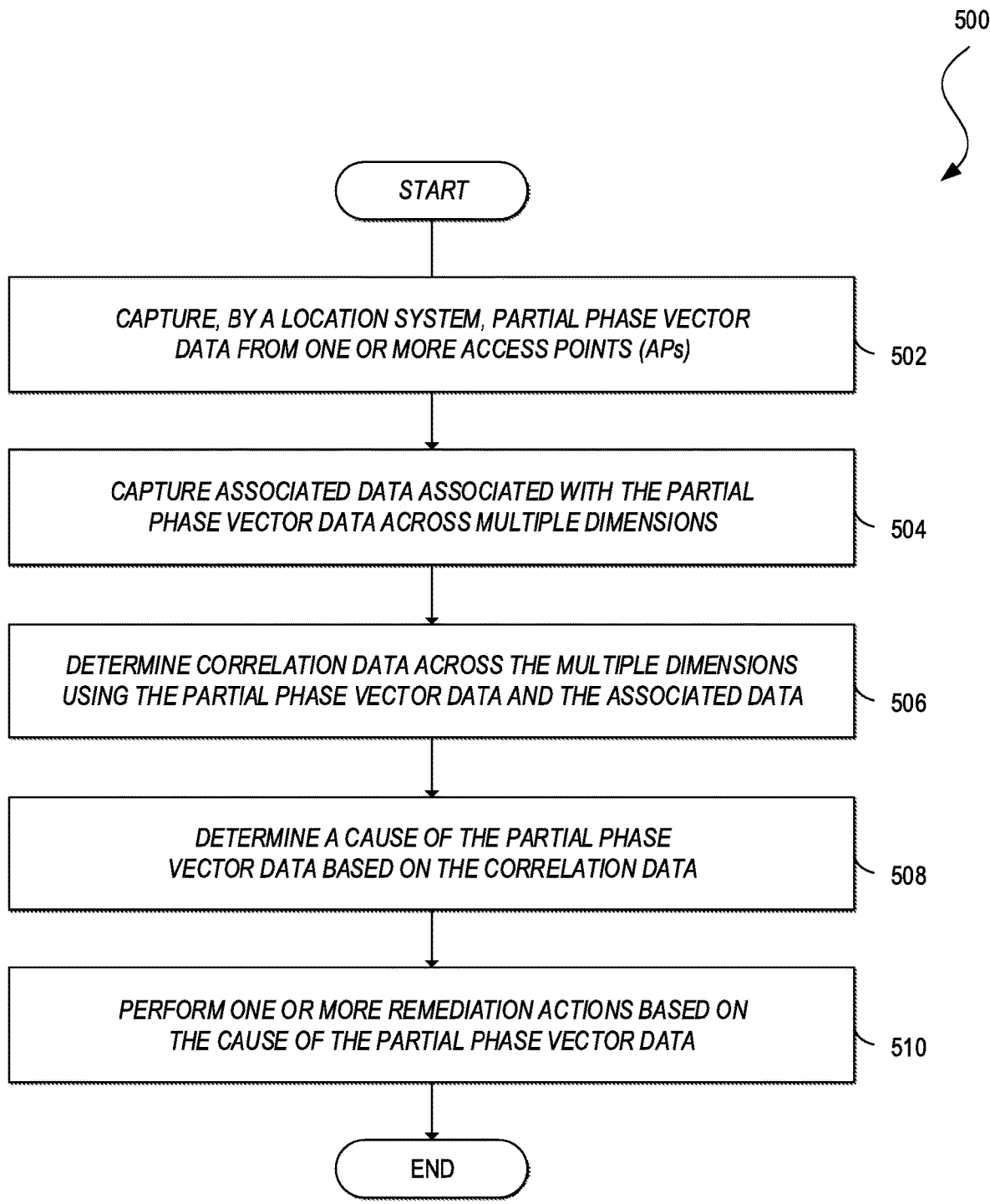
FIG. 5 illustrates an example of a process for improving the accuracy of a location system using partial phase vectors as a network sensor in accordance with an embodiment.

FIG. 5 illustrates a flow diagram of an example of a process 500 for improving the accuracy of a location system by using partial phase vectors as a network sensor. In this example, the process 500 may be performed by the location system. However, one of ordinary skill in the art will understand that the process 500 may be performed by one or more access points (e.g., the access points 128), one or more client devices (e.g., the endpoint devices 130), a network management system (e.g., the network management system implemented by the network controller appliances 104) or a component of the network management system (e.g., an assurance subsystem, an analytics subsystem, etc.).

The process 500 may begin with step 502 in which the location system may capture first partial phase vector data from one or more APs. A phase value can be defined as the phase at which an incident wave enters AP. A location system including two or more APs may derive AoA measurements from a client device's RF signals based on the phase values reported by the APs. An AP can capture one phase value for each antenna in the AP's antenna array, and the aggregate phase values can make up a phase vector. An AP can detect a partial phase vector when there are one or more missing phase values in the phase vector.

At step 504, the location system can capture first associated data associated with the partial phase vector data captured at step 502 across multiple dimensions or domains, such as identity data of the APs that captured the partial phase vector data (e.g., MAC address, IP address, make, model, etc.), identity data of the client devices generating the partial phase vector data (e.g., MAC address, IP address, make, model, user/group, etc.), frequency band data associated with the partial phase vector data (e.g., 2.4 GHz, 5 GHz, etc.), location data associated with the partial phase vector data (e.g., the location of the APs, the location of the client devices, etc.), a time and date associated with the partial phase vector data, and other data pertaining to the partial phase vector data.

At step 506, the location system can determine correlation data across the multiple dimensions using the partial phase vector data and the associated data. In some embodiments, this can involve applying a clustering algorithm, such as one of the clustering algorithms discussed above (e.g., partitional clustering, hierarchical clustering, density-based clustering, and grid-based clustering, etc.) to the partial phase vector data and the associated data to determine the correlations among the multiple dimensions.

In some embodiments, the location system may generate a visualization of the correlation data. For example, the location system can generate a radar chart (also referred to as a web chart, web chart, spider chart, star chart, irregular polygon, polar chart, or Kiviat diagram). The radar chart can include a sequence of equi-angular radii, with each radius representing one of the dimensions of the associated data captured at step 504 (e.g., AP, client device, frequency band, space, time, etc.). The data length of each radius can be proportional to the magnitude of the dimension for the data point relative to the maximum magnitude of the dimension across all data points. A line can be drawn to connect the data values for each radius. This can give the radar chart a star-like appearance. In some embodiments, the radar chart can be regenerated by adding or removing dimensions from the chart.

At step 508, the location system can determine a cause of the partial phase vector data based on the correlation data, such as whether the cause is one or more of a malfunction of the APs, interference proximate to the APs, a malfunction of the client devices, the client devices operating in a sleeping mode, interference proximate to the client devices, a network configuration error associated with the frequency band, interference associated with the frequency band, an AP point grouping error associated with the spatial location, interference associated with the spatial location, a network configuration error associated with the time period, or interference associated with the time period.

In some embodiments, the location system may determine that the cause of the partial phase vector data is a malfunction of an AP instead of spatial interference if the AP outputs partial phase vector data but the location system does not detect nearby APs outputting partial phase vector data. The location system may further determine that the cause of the partial phase vector data is a malfunction of the AP at a particular frequency band if the partial phase vector data is concentrated in that frequency band.

In some embodiments, the location system may determine that the cause of the partial phase vector data is interference in a location if the location system observes that most of the partial phase vector data is concentrated at that location. The location system can further analyze frequency data to determine whether a particular frequency band is contributing to the partial phase vector data. The location system may also analyze AP identity and client identity data to determine whether the partial phase vector data is distributed across APs and client devices to rule out the cause of the partial phase vector being a malfunction AP or client device.

In some embodiments, the location system may determine that the cause of partial vector data is interference during a certain time period if the partial phase vector data is concentrated during that time. The location system may also analyze AP identity and client device identity data to determine whether the partial phase vector data is distributed across APs and clients to make sure that the cause of the partial vector data is not an AP or client device.

In some embodiments, the location system can aggregate the partial phase vector data and associated data across multiple dimensions and apply the aggregated data to machine learning models, such as unsupervised learning or clustering models, among others, to determine the dimensions having the strongest correlation. In some embodiments, the location system can present visualizations of the aggregated data across the multiple dimensions. In one embodiment, the location system can present the aggregated data in radar chart form (also referred to as a web chart, spider chart, star chart, star plot, cobweb chart, irregular polygon, polar chart, Kiviat diagram, etc.) to enable a user to identify the dimensions of the aggregated data having the strongest correlation.

The process 500 can conclude with step 510 in which the location system can perform one or more remediation actions based on the cause of the partial phase vector data. Past actions taken to remediate previous instances of partial phase vector data and associated data in the same class or cluster as the current state of the location system may be performed to address the current state of the location system if those past instances strongly correlate to the current state of the location system. Some examples of remediation actions can include temporarily removing a malfunctional AP out of an AP group for location computation, tagging the malfunctional client device, changing the APs to operate in a different channel if its determined that the current channel has extra interference (e.g., due to heavy traffic), temporarily increasing the number of Block Acknowledgement Requests (BARs) that APs send to certain clients (this can temporarily increase network traffic and consume additional power but can reduce the chances that the APs will report partial phase vectors and thereby increase location accuracy), avoid grouping APs in a band among other remediation actions, and so forth.

In some embodiments, the location system may determine the cause of the partial phase vector data is a particular client device if the observed partial phase vector data is specific to a certain client MAC address. In one embodiment, the location system may determine that a group of the same type of client devices is the cause of partial phase vector data. The location system can initiate a workflow to determine whether the "location protocol" is suitable for this class of client devices, or whether the location algorithm needs to be altered for this class of client devices to optimize location accuracy for the class. The location system can further analyze location data or temporal data to determine whether the cause of the partial phase vector data is tied to a specific area or duration to ensure that these dimensions are not the cause of the partial phase vector data.

FIG. 6 illustrates an example of a network device 600 (e.g., switch, router, network appliance, etc.). The network device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the network device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 600.

Regardless of the network device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
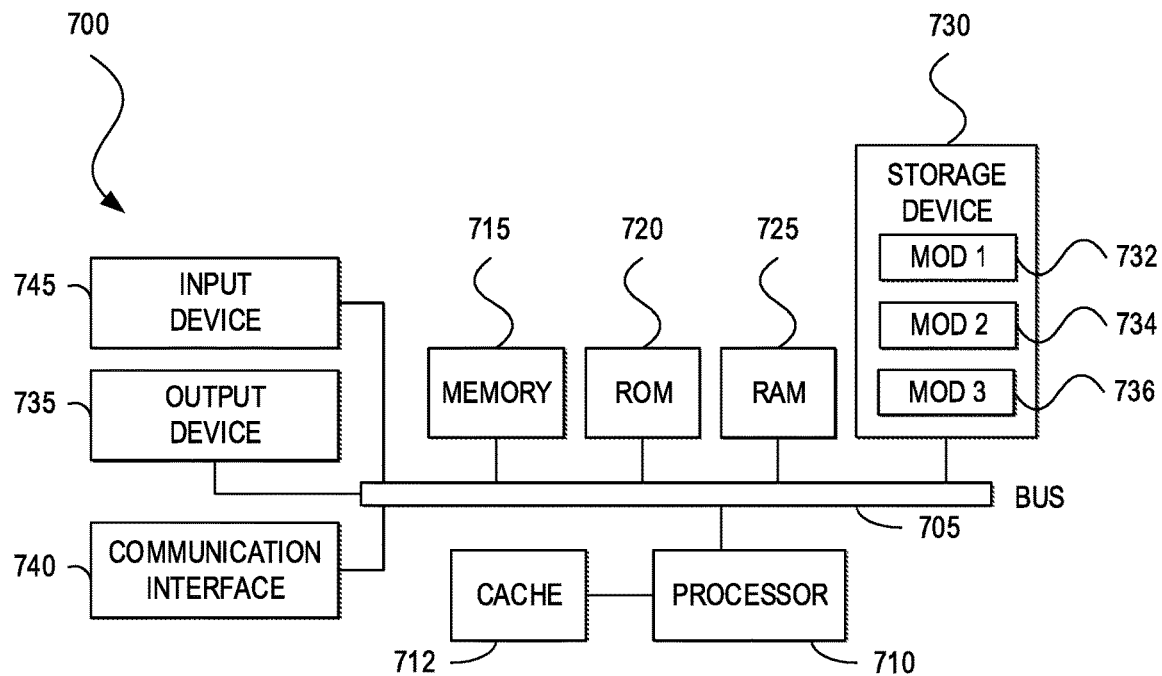
FIGS. 7A and 7B illustrate examples of systems in accordance with some embodiments.
Figure 7B:
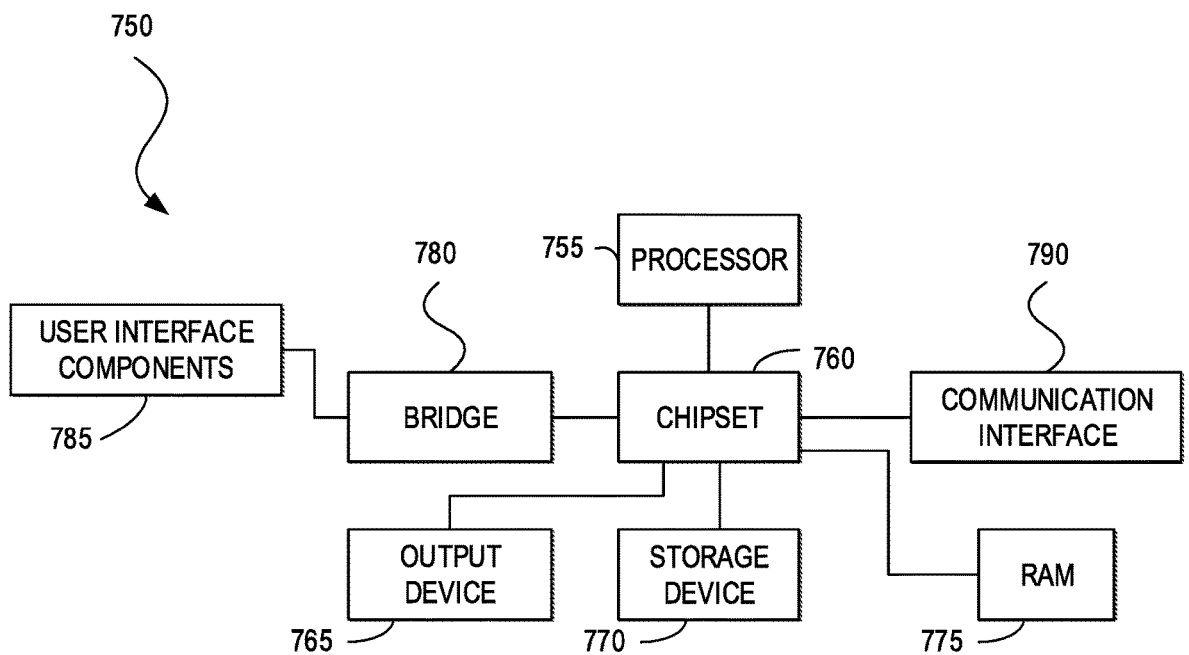

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
  obtaining, by a location system, a phase vector associated with an access point by capturing two or more phase value measurements for two or more antennas included in the access point, wherein each respective phase value measurement is associated with a phase at which an incident wave enters the access point;
  determining, by the location system, based on the phase vector missing the phase value measurements for at least one antenna included in the access point, that the phase vector is a partial phase vector;
  capturing, by the location system, associated data for the partial phase vector, wherein the associated data is associated with the partial phase vector and includes multiple operational parameters of the access point, wherein the multiple operational parameters include one or more of frequency band data or location data associated with the access point capturing the partial phase vector and location data associated with a client device transmitting the incident wave;
  determining, by the location system, one or more correlations between the partial phase vector and the associated data by clustering the partial phase vector and the associated data, wherein the clustering is performed across the multiple-operational parameters included in the associated data;
  determining, by the location system, a cause of the partial phase vector missing the phase value measurements for at least one antenna included in the access point, based on the associated data and the determined one or more correlations between the partial phase vector and the associated data; and
  performing, by the location system, one or more remediation actions based on the determined cause of the missing phase value measurements for the partial phase vector, wherein the one or more remediation actions restore the missing phase value measurements for the partial phase vector.

2. The computer-implemented method of claim 1, wherein the determined cause of the partial phase vector is one of a malfunction of the access point or interference proximate to the access point.

3. The computer-implemented method of claim 1, wherein the determined cause of the partial phase vector is one of a malfunction of one or more client devices, the one or more client devices operating in a sleeping mode, or interference proximate to the one or more client devices.

4. The computer-implemented method of claim 1, wherein the determined cause of the partial phase vector is one of a network configuration error associated with a frequency band or interference associated with the frequency band.

5. The computer-implemented method of claim 1, wherein the determined cause of the partial phase vector is one of an access point grouping error associated with a spatial location of the access point or interference associated with the spatial location.

6. The computer-implemented method of claim 1, wherein the determined cause of the partial phase vector is one of a network configuration error associated with a time or a date of the partial phase vector or interference associated with the time or the date.

7. The computer-implemented method of claim 1, further comprising:
removing one or more malfunctioning access points from an access point group for location computation.

8. The computer-implemented method of claim 1, further comprising:
tagging one or more malfunctioning client devices.

9. The computer-implemented method of claim 1, further comprising:
changing a frequency band of the access point.

10. The computer-implemented method of claim 1, further comprising:
determining that a class of client devices is the determined cause of the partial phase vector; and
altering a location algorithm for optimizing location accuracy for the class of client devices.

11. The computer-implemented method of claim 1, further comprising:
generating a first radar chart indicative of the one or more correlations between the partial phase vector and the associated data across the multiple operational parameters.

12. The computer-implemented method of claim 11, further comprising:
generating a second radar chart by removing one or more of the multiple operational parameters from the first radar chart.

13. A system, comprising:
one or more processors; and
memory including instructions that, when executed by the one or more processors, cause the system to:
obtain a partial phase vector associated with an access point by capturing two or more phase value measurements for two or more antennas included in the access point, wherein each respective phase value measurement is associated with a phase at which an incident wave enters the access point;
determine, based on the phase vector missing the phase value measurements for at least one antenna included in the access point, that the phase vector is a partial phase vector;
capture associated data for the partial phase vector, wherein the associated data is associated with the given partial phase vector and includes multiple operational parameters of the access point, wherein the multiple operational parameters include one or more of frequency band data or location data that are associated with the access point capturing the partial phase vector and location data associated with a client device transmitting the incident wave;
determine one or more correlations between the partial phase vector and the associated data by clustering the partial phase vector and the associated data, wherein the clustering is performed across the multiple operational parameters included in the associated data;
determine a cause of the partial phase vector missing the phase value measurements for at least one antenna included in the access point, based on the associated data and the determined one or more correlations between the partial phase vector and the associated data; and
perform one or more remediation actions based on the determined cause of the missing phase value measurements for the partial phase vector, wherein the one or more remediation actions restore the missing phase value measurements for the partial phase vector.

14. The system of claim 13, wherein the instructions, when executed, further cause the system to:
increase a number of Block Acknowledgment Responses (BARs) to transmit to a client device located proximate to the access point.

15. The system of claim 13, wherein the instructions, when executed, further cause the system to:
generate a first radar chart indicative of the one or more correlations determined between the partial phase vector and the associated data across the multiple operational parameters.

16. The system of claim 15, wherein the instructions, when executed, further cause the system to:
generate a second radar chart by removing one or more of the multiple operational parameters from the first radar chart.

17. A non-transitory computer-readable storage medium including instructions that, upon being executed by one or more processors of a system, cause the system to:
obtain a partial phase vector associated with an access point by capturing two or more phase value measurements for two or more antennas included in the access point, wherein each respective phase value measurement is associated with a phase at which an incident wave enters the access point;
determine, based on the phase vector missing the phase value measurements for at least one antenna included in the access point, that the phase vector is a partial phase vector;
capture associated data for the partial phase vector, wherein the associated data is associated with the given partial phase vector and includes multiple operational parameters of the access point, wherein the multiple operational parameters include one or more of frequency band data or location data that are associated with the access point capturing the partial phase vector and location data associated with a client device transmitting the incident wave;

determine one or more correlations between the partial phase vector and the associated data by clustering the partial phase vector and the associated data, wherein the clustering is performed across the multiple operational parameters included in the associated data;

determine a cause of the partial phase vector missing the phase value measurements for at least one antenna included in the access point, based on the associated data and the determined one or more correlations between the partial phase vector and the associated data; and perform one or more remediation actions based on the determined cause of the missing phase value measurements for the partial phase vector, wherein the one or more remediation actions restore the missing phase value measurements for the partial phase vector.

18. The non-transitory computer-readable storage medium of claim 17, wherein the instructions, when executed, further cause the system to:

remove one or more malfunctioning access points from an access point group for location computation.

19. The non-transitory computer-readable storage medium of claim 17, wherein the instructions, when executed, further cause the system to:

change a frequency band of the access point.

20. The non-transitory computer-readable storage medium of claim 17, wherein the instructions, when executed, further cause the system to:

determine that a class of client devices is the determined cause of the partial phase vector; and alter a location algorithm for optimizing location accuracy for the class of client devices.

* * * * *